United States Patent [19]
Erlichman et al.

[11] 3,950,766
[45] Apr. 13, 1976

[54] EXPOSURE CONTROL SYSTEM EMPLOYING BLADE SENSING FOLLOW FOCUS ARRANGEMENT

[75] Inventors: Irving Erlichman, Wayland; Christopher R. Rice, Wakefield, both of Mass.

[73] Assignee: Polaroid Corporation, Cambridge, Mass.

[22] Filed: Nov. 22, 1974

[21] Appl. No.: 526,390

[52] U.S. Cl. .................. 354/29; 354/34; 354/42; 354/44; 354/230
[51] Int. Cl.² ................................................ G03B 7/14
[58] Field of Search ............................ 354/26–30, 354/40, 43, 44, 34, 42, 228–232, 270–272, 139, 149

[56] References Cited
UNITED STATES PATENTS

| | | | |
|---|---|---|---|
| 3,611,895 | 10/1971 | Albedyll et al. | 354/43 X |
| 3,638,545 | 2/1972 | Kobayashi et al. | 354/34 |
| 3,668,994 | 6/1972 | Fujii | 354/27 |
| 3,695,158 | 10/1972 | Fahlenberg | 354/60 X |
| 3,738,240 | 6/1973 | Mitani et al. | 354/40 X |
| 3,750,543 | 8/1973 | Eloranta et al. | 354/27 |
| 3,772,974 | 11/1973 | Shimomura | 354/44 X |
| 3,832,722 | 8/1974 | Douglas | 354/230 X |

*Primary Examiner*—L. T. Hix
*Assistant Examiner*—James LaBarre
*Attorney, Agent, or Firm*—David R. Thornton

[57] ABSTRACT

An exposure control system for photographic apparatus utilizing pulse driven shutter-diaphragm light regulating elements in conjunction with a follow focus mechanism which in response to the location of the light regulating elements terminates the driving operation thereby automatically selecting an aperture value for flash operation. The follow focus mechanism locates a sensor switch in the path of travel of a pair of aperture defining blades as a function of scene ranging such that the sensor switch is actuated by the blades as the latter are displaced to the selected switch location and, in turn, terminates further pulses to the stepper motor thereby stopping the blades at a predetermined location defining a selected aperture value.

15 Claims, 4 Drawing Figures

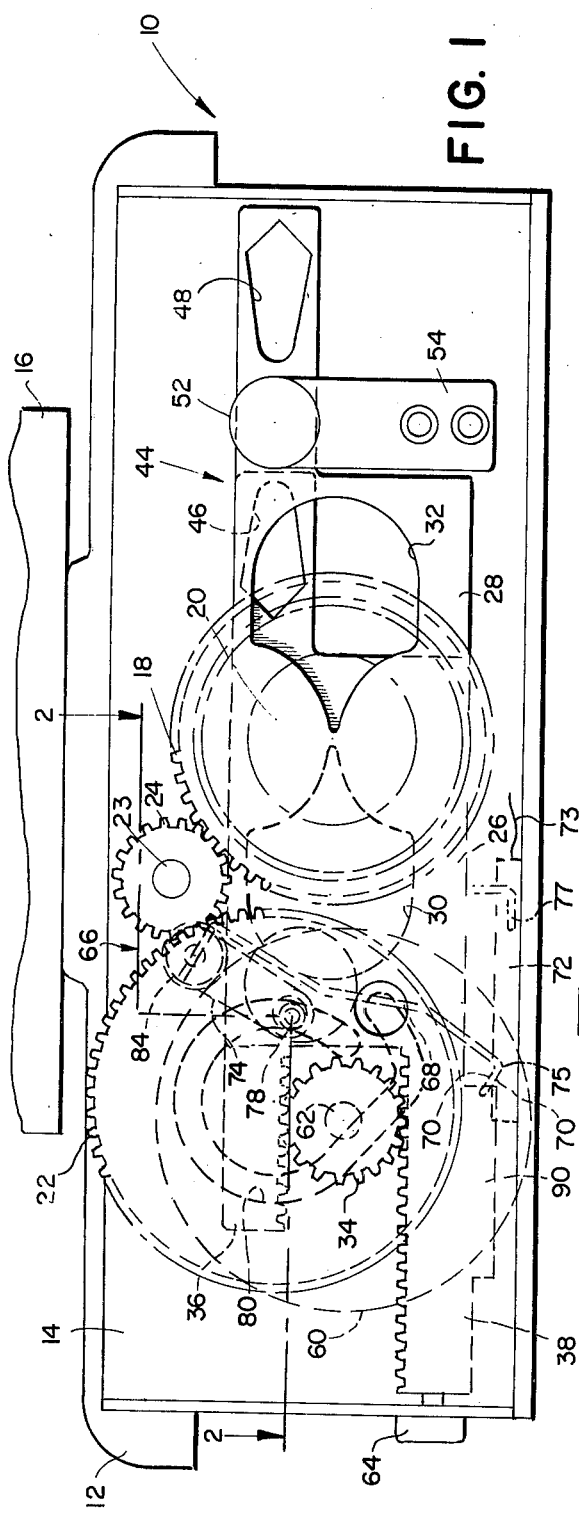
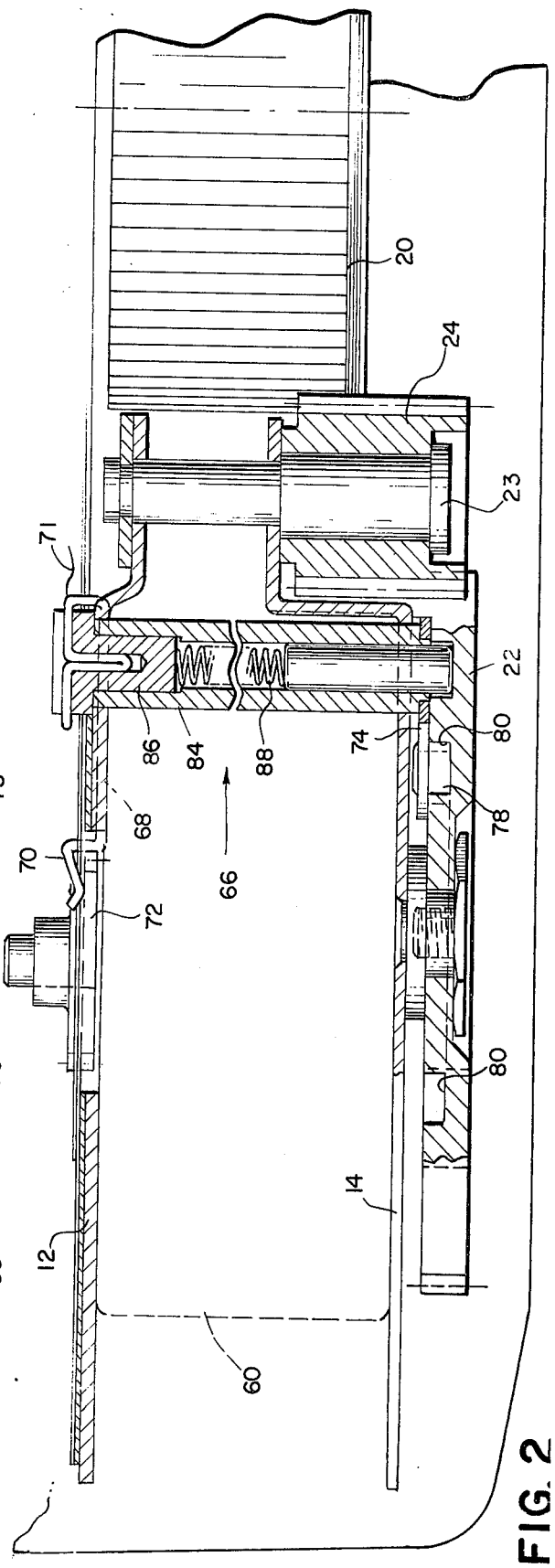

EXPOSURE CONTROL SYSTEM EMPLOYING BLADE SENSING FOLLOW FOCUS ARRANGEMENT

BACKGROUND OF THE INVENTION

This invention relates to photographic exposure control systems and, more particularly, to an exposure control system for artificial illumination in which an aperture value is determined in accordance with scene ranging.

Fully automated, highly compact cameras powered by a small battery located within the camera require efficient, low power shutter drive systems. Additionally, such shutter mechanisms may be called to function within the complex photographic cycle required for a fully automated, single lens reflex camera to carry out viewing operations and the like. A photographic exposure control system designed for such automatic reflex operation is described in a copending application for U.S. patent by Irving Erlichman entitled, "Non-Cocking Springless Shutter Developing Two Parameter Exposure Regulation", Ser. No. 362,926, filed May 22, 1973 and assigned in common herewith. The above-noted application describes an exposure control mechanism in which a stepper motor is utilized to drive a pair of shutter-diaphragm blades in synchronism so as to define a predetermined variation of aperture values over the camera optical path. In this arrangement, the blades are driven through a series of steps or halting positions defining gradual variation in aperture value in accordance with the stepper motor magnetic detents and responsive to successive pulses from a digital network, and exposure regulation is provided by a light sensing network to automatically determine a suitable exposure cycle as a function of scene brightness. It is desirable, however, to utilize a different mode of operation, responsive to scene ranging when the camera is employed under artificial illumination.

SUMMARY OF THE INVENTION

The present invention is directed to an exposure control system utilizing an electrically energized drive for moving and positioning light controlling exposure elements under artificial flash illumination conditions. The control system includes a sensor element which is positionable in the path of the blades in accordance with scene ranging so as to signal the electrical drive to cease operation when the light controlling elements reach a selected position and define an aperture value suitable for the selected subject distance. In a preferred arrangement, the sensor is present as a switch device whose position along the path and travel of the light controlling elements is determined in accordance with focusing, and thus related to subject distance. The switch element is coupled to the stepper motor pulse control network and is operable in accordance with engagement of the exposure control elements to stop the pulse drive of the motor and thereby fix the blades in a selected aperture value position during the flash interval.

In this arrangement, control over the stepper motor drive is carried out in accordance with a pulse network which, upon initiation of an exposure control cycle, is triggered to provide stepping pulses of a forward, or open shutter, directional sense to drive a pair of shutter blades towards their open position. The pulse network is also coupled to a follow focus switch which is selectively positioned alongside the blade path as a function of lens focusing so as to be engaged by the blades and provide a signal to the pulse network to terminate the pulses and thereby hold the shutter blades in a selected aperture defining position. Accordingly, an important object of this invention is to provide an exposure control system responsive to scene ranging for artificial illumination exposures.

Another object of this invention is to provide an exposure control system and method for selecting an aperture value in accordance with a subject distance determination.

A still further object of the invention is to provide a shutter-diaphragm blade system having a simplified follow focus switch arrangement located alongside the path of blade travel in accordance with lens of focusing and which, in response to blade engagement, terminates further operation of the blade drive so as to set an aperture value consistent with focusing.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to note the same parts and wherein:

FIG. 1 is a diagrammatic, front elevational view of an exposure control housing of a photographic camera incorporating the exposure control system of the instant invention;

FIG. 2 is a greatly enlarged view in section of a follow focus mechanism of the exposure control housing shown in FIG. 1 and taken along the line 2—2;

DETAILED DESCRIPTION OF THE INVENTION

Figure 3:
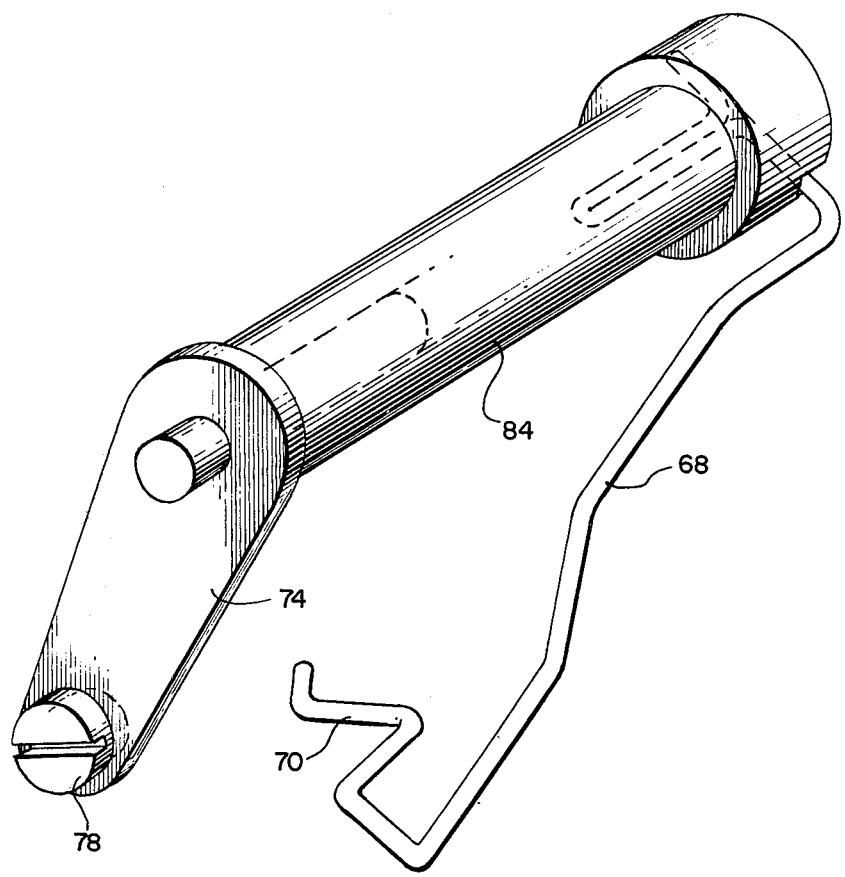
FIG. 3 is a view in perspective of the follow focus linkage and switch mechanism shown in FIGS. 1 and 2.

In FIG. 1, an exposure control housing 10 is shown having a rear casing or wall 12 serving as a principal support. The rear casting 12 serves to support an exposure mechanism mounting plate 14 which, in turn, supports an externally geared bezel 18, the latter being rotatable to focus the taking or objective lens 20 of the camera. Focusing movement of the lens bezel 18 is provided by a manually operable geared focusing wheel 22 through an interposed idler gear 24.

The rear casting 12 also serves to support two exposure elements or blades 26 and 28 formed with tapered apertures or main openings 30 and 32 which, during camera operation, overlap or, that is, are brought into at least partial registration about the center of the taking lens 20 to define a variation of aperture values positioned in the exposure path. Synchronous movement of the blades 26 and 28 is realized by their mutual geared interconnection with a drive pinion 34, the latter being in connection to rack extensions 36 and 38 located at one end of the blades 26 and 28, respectively. The opposite ends of the blades 26 and 28 also carry tapered secondary openings 46 and 48, respectively, which in conjunction with displacement of the blades define secondary aperture values within a light sensing station depicted generally at 44. The station 44 includes a lens 52 having a field of view corresponding with taking lens 20 and which is supported by a bracket 54 on the rear casting 12.

Driving power for displacement of the blades 26 and 28 is accomplished by means of a stepper motor 60, the output shaft 62 of which is journaled within pinion 34. The motor 60 is of relatively thin dimension and is located between rear casting 12 and the mounting plate 14 and attached to the latter. When motor 60 is selectively energized, it is capable of driving the blades 26 and 28 from an orientation fully blocking the optical path as shown in FIG. 1 towards an open orientation (not shown) such that the main opening 30 and 32 define a progressive variation of aperture values until a full aperture opening is reached. A switch unit, depicted at 64, is actuated by the blade 28 when the latter reaches its closed shutter position and thereby indicates the start position for the blade operation.

Although the exposure control system of the invention described herein is particularly suited for use in artificial illumination modes where scene ranging control is particularly applicable, the exposure control system is also designed for ambient mode operation. In both modes of operation, the blades 26 and 28 function as both a shutter and diaphragm, and hence define both as aperture values and an interval of exposure for the camera. For ambient operation, as described in the above-noted U.S. patent application, Ser. No. 362,926, the motor 60 is pulsed in one direction sense until a sufficient aperture value and exposure interval have been achieved as determined from the light sensing station 44, and then pulsed in the opposite direction sense to reverse rotation of the pinion 34 and reassume the closed or light blocking orientation shown in FIG. 1.

Figure 4:
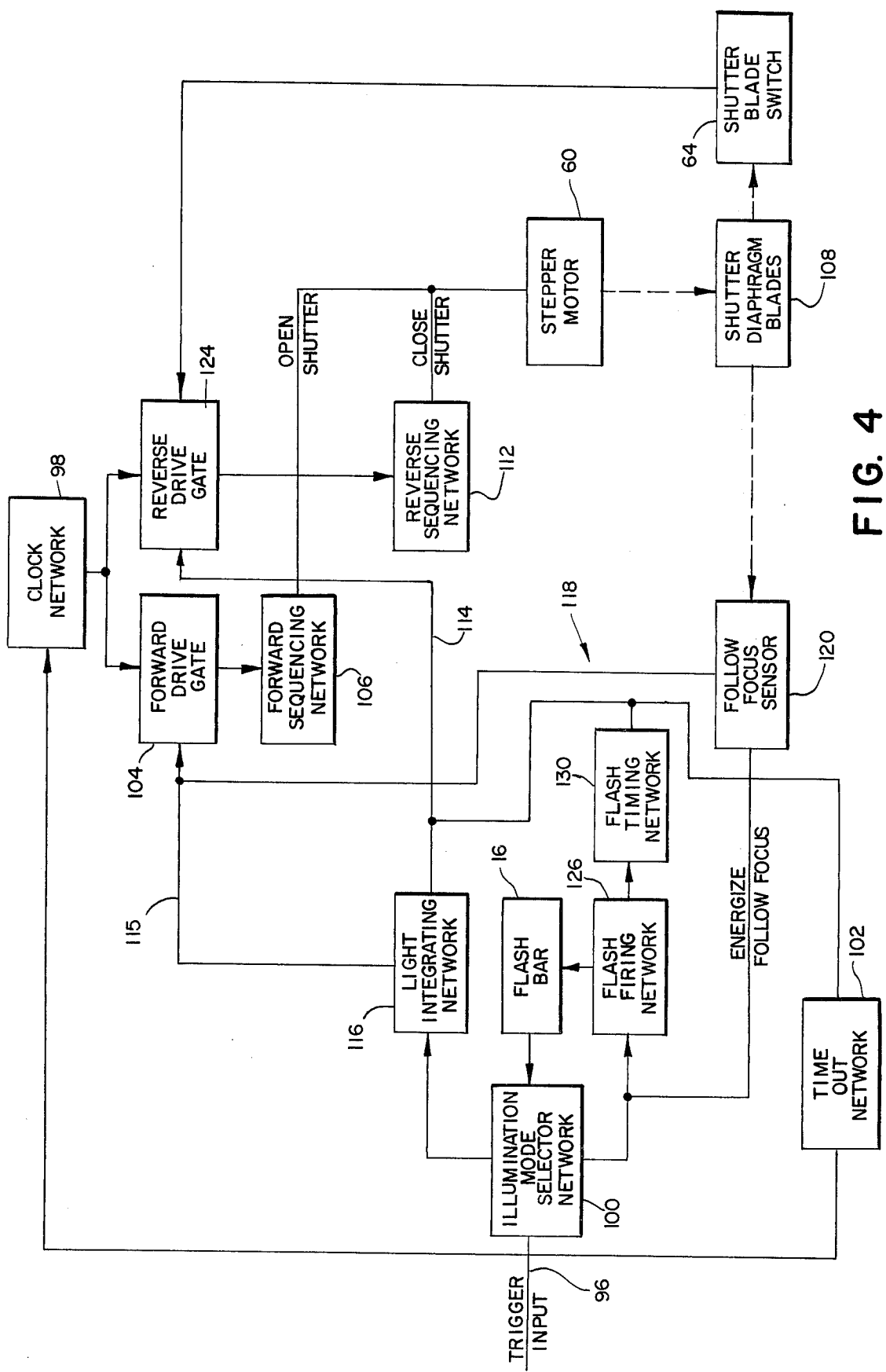
FIG. 4 is a block diagram depicting the electrical functions of the exposure control system of the invention.

In the illustrated embodiment of the present invention, when a flashbar partially shown at 16 is mounted in connection to the exposure control system, as later explained in detail with regards to FIG. 4, the operation of the light sensing station 44 is circumvented and a follow focus mechanism generally designated at 66 is rendered operable. The follow focus mechanism 66, as shown in FIGS. 1–3, includes an arm member or switch arm 68 which is configured to have one end 70 thereof positioned along the length of a contact pad 72 in accordance with rotation of the focusing wheel 22. The switch arm 68 and the pad 72 are constructed of electrically conductive material, such as a copper alloy, and connected to the exposure control circuit by printed circuit leads depicted at 71 and 73.

Positioning of the arm 68 is accomplished by means of a cam follower arm 74 which is coupled at one end through a sleeve 84 to the switch arm 68 and is at its opposite end in cam following relation to the follow focus wheel 22 by means of a cam follower designated at 78; the latter being located within a camming track 80 of the underside of the focus wheel 22. In FIG. 1, the contact end 70 of the switch arm is shown at a first position designated at 75 which is representative of relatively close subject distances and in phantom at a point designated at 77, representative of far subject distance.

Referring now to FIGS. 2 and 3 where the follow focus mechanism 66 is shown in greater detail, it can be seen that the cam follower arm 74 is coupled to the follow focus switch arm 68 by means of the sleeve 84 which is pivotally mounted between the support plate 14 and the rear casing 12. The spring arm 68 is fixed to the sleeve 84 by means of an electrically insulative bushing 86. The latter is slideably mounted within the sleeve 84 but keyed thereto so as to provide rotation of the switch arm 68 in accordance with sleeve rotation. A spring member designated at 88 is utilized to bias the bushing 86 toward the support plate 14 and hence the switch arm 68 into engagement with the pad 72 which is carried on the rear casing 12.

As later explained in detail with regard to the circuit diagram of FIG. 4, the follow focus switch arm 68 in conjunction with the contact pad 72 operate as a sensor to indicate the location of the blades 26 and 28 during an exposure operation in accordance with cooperation of the follow focus switch arm 68 with a depending tab extension 90 of the blade member 26. Hence, during the operation of the exposure control unit, as the blades 26 and 28 are driven from a blocking position, the depending element 90 of the blade 26, which like the blade itself is of electrically insulative plastic material, will pass between the contact end 70 of the switch arm 68 and the pad 72 thereby interrupting their circuit connection. This interruption, in turn, is utilized to stop the drive pulses to the stepper motor and hence in turn stop the blades in a predetermined location which provides an aperture of appropriate size in accordance with focusing of the lens 20. Consequently, the follow focus mechanism 66 broadly includes sensing means for providing an output signal responsive to displacement of the blade member to the vicinity of an actuator portion (switch arm 68) of sensor and means for displacing the actuator portion to a predetermined location along the blade path in accordance with scene ranging so as to provide selection of a particular aperture value in accordance with a subject distance determination.

Prior to describing the detailed operation of the exposure control system of the invention, it should be noted that the novel system is intended for use in an automatic single lens reflex camera such as, for example, is described in U.S. Pat. No. 3,820,128. In the indicated camera, various operational events occur in the course of a single photographic cycle which are in addition to the exposure phase. For example, during a pre-exposure phase of the photographic cycle, the control components of the camera secure the exposure chamber of the camera by relocating its mirror and by actuating the stepper motor to close the shutter blades. Additionally, during a post-exposure phase, the camera control system advances the exposed film unit from the film plane for processing and conditions and camera for viewing by, for example, again relocating the mirror and opening the shutter blades. Inasmuch as the exposure control system of the present invention is also applicable to cameras other than single lens reflex, and is particularly directed, in any case, solely to the exposure phase of the camera operation, the control system is herein described with respect to FIG. 4 without regard to operational events which will occur before or after the completion of the exposure. Consequently, while in a single lens reflex camera the actual start of the exposure phase will often be derived from a particular operational event occurring in the pre-exposure phase, it is herein shown in FIG. 4 simply as a trigger signal on input line 96, which can be derived directly from an actuator button of the camera or from any other operational event which must precede the actual exposure phase. The trigger signal is depicted as passing to a variety of networks including a clock network 98, an illumination mode selector network 100, and a time out network 102. Upon triggering of the clock network 98, the latter produces timing pulses passing through a forward drive gate 104 to a forward sequencing network 106 which energizes the stepper in a sequence designed to displace the shutter diaphragm blades, designated in FIG. 4 by block 108, in an opening direction so as to provide progressively enlarging aperture values.

Closing of the shutter-diaphragm blades is subsequently accomplished by means of a reverse sequencing network designated at 112. As explained below in detail, the latter is triggered into operation by a close shutter signal received on line 114 from either a light integrating network 116 or flash network generally designated at 118.

For clarity, the sequencing circuits 106 and 112 are shown herein as separate networks, which would each comprise a series of flip-flop circuits or the like interconnected to deliver the clock pulses to the motor in a conventional manner to program the motor in a forward or reverse direction. Preferably these sequencing networks would be combined in a single network with the gates 104 and 124 and include flip-flop circuits which are switched from forward to reverse order upon reception of appropriate signals. It should also be noted that the pulses from the clock network 98 are passed through a reverse drive gate 124 to the reverse sequencing network 112 so that the operation of the latter is also functionally related to the shutter blade switch 64. In this arrangement, the reverse drive gate 124 is held closed or non-conducting when the blades are in their closed position so that the motor drive operation for the exposure phase must always start in the blade opening direction to be subsequently followed by a closing operation.

Referrring again to the trigger signal on line 96, it should be noted that the latter is also conducted to a time out network 102 comprising a simple delay circuit which after a suitable delay, in excess of the expected time of exposure, provides a signal on line 114 to reverse the motor sequence thereby closing the shutter and, in effect, provides a fail-safe feature to terminate the exposure phase.

Under normal conditions, however, the exposure phase is completed by either the light integrating network 116 or the flash network 118, one of which is selected for operation by the illumination mode selector network 100. The latter is responsive to reception of the flashbar 16 and may take the form of a switch and latching circuit arrangement which in accordance with flash insertion in the camera housing 10 arms the flash network 110 and disarms or disables the light integrating network 112 so as to program the camera operation for the artificial illumination mode of operation.

Prior to describing the flash mode operation to which the present invention is directed, the overall exposure control circuit will be described with regard to ambient operation. In the ambient mode, as the shutter diaphragm blades open responsive to triggering of the clock network, the light integrating network 116, responsive to uncovering of the photocell 52, integrates the received light by means of a charging capacitor (not shown) until a predetermined value is reached, at which time, by means of a trigger circuit (not shown), a trigger pulse is directed along a line 114 to the reverse drive gate 124 to render it conductive thereby reversing the pulse sequence so as to close the shutter which resets the system for a further exposure. During the operation of the light integrating network, a latching signal is also delivered the forward drive gate 104 by means of line 115 to hold the latter in a conducting state thereby permitting forward pulse operation. When the closing signal is delivered by the light integrating network 116, the latching signal to the gate 104 is removed thereby stopping forward pulsing at the initiation reverse pulsing. For low light level ambient conditions, where a fully open aperture is employed, a counter (not shown), upon recording a number of pulses signifying a fully open aperture, stops further operation until the close shutter signal is received from the light integrating network 100.

In the artificial illumination modes upon insertion of the flashbar 16, the illumination mode selector network 100 activates the flash network 118 by energizing a flash firing network 126 and the follow focus switch designated at 120. In operation, the follow focus switch or sensor 120 which essentially comprises the switch arm 68 and the contact pad 72 is configured to sense the position of the shutter diaphragm blades and responsive thereto to hold or interrupt the forward pulse program from the clock network 98. The latter is accomplished by means of the forward drive gate 104 which is held in a conductive state as long as a signal is received through the follow focus switch 120. Upon interruption of the latter signal, resulting from opening of the switch 120 by the shutter diaphragm blades, forward drive pulses are stopped, which, in turn, halts the blades at a point defining an aperture value which is a function of the switch position and, hence, a function of focusing of the camera lens. Following the halting of the blades, a flash unit (not shown) of the flashbar 16 is fired and the sequencing program then reversed to close the blades. The flash firing is achieved by the flash firing network 126 which after a time delay sufficient to permit the shutter to open to the selected aperture, triggers a flash selecting circuit, which selects and fires one unit of the flashbar 16. Firing of the flash, in turn, activates a flash timing network 130 which after a time equal to the flash interval provides a blade closing signal on line 114 to the reverse drive gate 124 so that the blades are driven to a closed position thereby completing the exposure phase of the camera cycle. Typical flash firing and timing networks are shown, for example, in U.S. Pat. No. 3,820,128.

In the illustrated embodiment, the follow focus arrangement 66 employs interruption or opening of the follow focus switch 120 to interrupt the flow of forward stepping pulses to the stepper motor 60, however, other arrangements are also applicable. For example, the blade 26 may carry a conductive pad (not shown) which upon contact with the switch arm 68 would complete the circuit thereby signaling the stepper motor drive, etc. Further, it should be noted that while the aperture setting device of the invention has been described with regard to follow focus mechanism, it can be utilized with any ranging system configured for positioning the switch arm 68 in accordance with a selected subject distance.

It should also be noted that while the invention has been described with regard to a camera having its light sensitive network 116 circumvented during flash operation, it is also equally applicable to a so-called hybrid arrangement wherein the light sensing network continues to operate during the flash mode, and under typical operating conditions is designed to provide a reverse or closing signal to the reverse drive gate 124 so as to close the shutter early enough to partially clip the flash interval. Working around that design point, the light integrating network increases or decreases the exposure interval to thereby increase or decrease the total amount of flash illumination admitted to the film in accordance with scene brightness.

Those familiar with the photographic arts will readily appreciate the novel and highly unique advantages of this invention which provides a simple, economical arrangement for selecting an aperture value as a function of scene ranging. The exposure control system of the invention locates a switch arm in follow focus relation to the lens system along the path of travel of the aperture defining blades so as to signal the drive network to halt the blades at a predetermined position in accordance with engagement of the blades with the switch arm.

Further, it can be readily seen that this invention may be practiced or embodied in still other ways without departing from the spirit or essential character thereof. The embodiment described herein is therefore illustrative and not restrictive, the scope of the invention being indicated by the appended claims, all inventions which come within the meaning of the claims are intended to be embraced therein.

What is claimed is:

1. A photographic exposure control system for regulating the transmission of image-carrying light rays along an optical path to photographic film material mounted at a given focal plane, said system comprising:
a blade mechanism operative for defining progressively changing aperture values in operative relation to the optical path, said blade mechanism including at least one member mounted for displacement along a first path in accordance with operation of said blade mechanism such that the position of said member along its said first path is in correspondence with one of said aperture values;
control means for operating said blade mechanism to define a predetermined aperture value in operative relation to the optical path, said control means including drive means energizeable between a first state wherein said drive means operates said blade mechanism to define progressively changing aperture values and a second state wherein said drive means halts further operation of said blade mechanism, sensor means for determining when said member has reached a predetermined position which is in correspondence with said predetermined aperture value, said sensor means including a sensor having an actuator portion and means for mounting at least said actuator portion along a sensor path at least substantially parallel to said first path, said sensor providing a given output signal when said member is displaced to within a predetermined vicinity of said actuator portion, and actuating means for coupling said drive means to a source of power and for energizing said drive means to said first state so as to operate said blade mechanism to define said progressively changing aperture values, said actuating means including terminating means responsive to said given output signal for at least temporarily providing the energization of said drive means to said second state so as to at least temporarily cease further operation of said blade mechanism when said blade mechanism defines said predetermined aperture value.

2. The system of claim 1 wherein said drive means includes a motor actuatable responsive to a given drive input signal, said actuating means includes means for applying said drive input signal to said motor, and said terminating means includes means for terminating further application of said drive input signal to said motor.

3. The system of claim 1 wherein said drive means includes a magnetically detented stepper motor configured for stepping drive operation in accordance with a pulse train input, said actuating means includes means for generating said pulse train and for conducting said pulse train in a given sequence to said stepper motor to step said motor in a given direction and accordingly rapidly step said blade mechanism through said progressively changing aperture values, and said terminating means includes means responsive to said given output signal for at least temporarily interrupting further conduction of pulses in said sequenced pulsed train to said motor.

4. The system of claim 1 wherein said member is a blade element mounted for displacement along said first path between one terminal position in blocking relation to the optical path and another terminal position in unblocking relation to the optical path, said blade element defining progressively changing aperture values in operative relation to the optical path during said displacement from said one to said other terminal position, said drive means includes a magnetically detented stepper motor configured for stepping drive operation in accordance with a pulse train input, said actuating means includes selectively operative pulse generating means for producing a train of pulses and means for transmitting said pulses to said motor in a first sequence to drive said motor in a first direction to displace said blade element from said one terminal position to define said progressively changing aperture values and initiate an exposure interval during which scene light is directed to the focal plane and for subsequently transmitting said pulses to said motor in a second sequence to drive said motor in an opposite direction to displace said blade element back to said one terminal position to block the optical path and terminate the exposure interval, and said terminating means includes means responsive to said given output signal for at least temporarily interrupting the transmission of said pulses through said means for transmitting said pulses.

5. The system of claim 1 wherein said terminating means includes means for at least temporarily interrupting further energization of said drive means responsive to said given output signal, said sensor means includes a sensor having at least an actuator portion thereof mounted for displacement to selective locations along said first path, said sensor providing said given output signal responsive to engagement of said member with said sensor actuator portion.

6. The system of claim 1 additionally including a lens for directing image-carrying light rays from the scene to the focal plane, and ranging means for determining the distance between said lens and the subject to be photographed, ranging means for displacing at least said actuator portion to a position on said sensor path selected in accordance with the determined subject distance.

7. The system of claim 6 wherein said lens is a variable lens, said ranging means includes means for varying said lens to focus the light rays on the focal plane, and said means for displacing said actuator portion includes means for coupling said actuator portion to said varying means such that said actuator portion is positioned in accordance with lens focusing.

8. The system of claim 1 wherein said member is a blade element mounted for displacement along said first path between one position blocking the optical path and other positions unblocking the optical path, said blade mechanism defining said changing aperture values as said blade element is displaced from said one position, and said system additionally including a variable lens for directing image-carrying rays along the optical path, focus means for varying said lens so as to focus image-carrying rays from the scene on the focal plane, and said sensor means includes means for positioning said actuator portion along its said sensor path responsive to said focus means so that said predetermined position of said element and the corresponding predetermined aperture value are automatically correlated to lens focusing.

9. The system of claim 8 wherein said blade mechanism defines progressively enlarging aperture values as said blade element is displaced from said one position.

10. A photographic exposure control system for regulating the transmission of image-carrying rays from a scene along a given optical path to photographic material mounted at a given focal plane, said system comprising at least one blade member, means for mounting said blade member for displacement along a given blade path between one and another position, said blade member blocking the optical path when said blade member is in said one position and unblocking the optical path when said blade member is in said other position and providing progressively changing aperture values within a given range of aperture values through which scene light may pass to the focal plane as said blade member is displaced from said one position, each of said aperture values being in correspondence with a respective position of said blade member along said blade path, sensor means for determining when said blade member has reached a predetermined position, said sensor means including a sensor having an actuator portion, said sensor providing a given output signal when said blade member is displaced to within a predetermined vicinity of said actuator portion, means for mounting at least said actuator portion for displacement along a sensor path at least substantially parallel to said blade path, drive means operative for displacing said blade member between its said positions, and actuating means for activating said drive means to displace said blade member from its said one position toward its said other position to initiate an exposure interval during which scene light is directed to the focal plane and for then at least temporarily terminating further activation of said drive means so as to interrupt said displacement of said blade member responsive to said given output signal to thereby select an aperture value in operative relation to the optical path in accordance with the location of said actuator portion along said sensor path.

11. The system of claim 10 additionally including means for predetermining an aperture value, and means coupled to said sensor means for displacing at least said actuator portion to a predetermined location along said sensor path in accordance with said predetermined aperture value.

12. The system of claim 10 additionally including a variable lens assembly for focusing the scene light rays on the focal plane, and said sensor means is coupled to said lens assembly in cam follower relation so as to position at least said actuator portion along said blade path in accordance with lens focusing.

13. The system of claim 10 wherein said sensor means includes a switch having an elongated contact pad located alongside the path of travel of said blade member and said actuator portion includes a switch arm configured for contact with said contact pad and for displacement therealong, and said blade member includes at least a portion of electrically insulative material configured to pass between said pad and said switch arm during displacement of said blade member from its said one position so as to interrupt the circuit connection therebetween and provide said given output signal.

14. A method of controlling the operation of a photographic camera to expose photographic film under flash illumination, said camera having a shutter-diaphragm system comprising at least one electrically driven blade member for displacement along a given blade path from one position blocking the optical path along which scene light is transmitted to said film to other positions unblocking the optical path, and means energizeable for displacing said blade member between said one and said other positions, said blade member defining progressively changing aperture values during said displacement through which scene light is transmitted to the film, each of said aperture values being correlated to the position of said blade member along said blade path, the method comprising the steps of:
  determining the subject distance of the scene to be photographed;
  predetermining a position of said blade member correlated to a desired aperture value for exposure at said subject distance with said flash illumination;
  energizing said drive means to displace said blade member from said one position and along said blade path so as to initiate an exposure interval during which scene light is passed to the film;
  providing a given output signal when said blade member has reached said predetermined position;
  terminating the energization of said drive means so as to halt further displacement of said blade member responsive to said given output signal;
  subsequently producing a flash of artificial illumination; and
  again energizing said drive means to displace said blade member to its said one position.

15. The method of claim 14 wherein said camera includes a variable lens assembly for focusing scene light rays on said film and a sensor for providing said given output signal when said blade member reaches a predetermined vicinity of said sensor, said subject distance determining step includes varying said lens to focus said scene light, and said position determining step includes positioning said sensor along said blade path in accordance with said lens variation.

* * * * *